June 29, 1965   L. B. GRATZER   3,191,380
JET NOISE SUPPRESSOR

Filed May 10, 1963   3 Sheets-Sheet 1

INVENTOR.
Louis B. Gratzer
BY Roy Mattern Jr.

INVENTOR.
Louis B. Gratzer
BY Roy E. Mattern Jr.

INVENTOR.
LOUIS B GRATZER
BY 3,191,380
JET NOISE SUPPRESSOR
Louis B. Gratzer, Seattle, Wash., assignor to The Boeing Company, Seattle, Wash., a corporation of Delaware
Substituted for abandoned application Ser. No. 816,984, May 29, 1959. This application May 10, 1963, Ser. No. 281,077
8 Claims. (Cl. 60—35.6)

This invention relates to the suppression of noise associated with turbojet engine operation, such noise emanating from about the exhaust stream subsequent to the ejection of the exhaust gases from the turbojet engine nozzles, and more particularly concerns a way in which the exhaust stream is controlled aerodynamically to accomplish the suppression of such noise.

The purpose of the invention is to suppress the noise to an acceptable level without incurring any substantial propulsive thrust losses, or requiring extensive structural or nozzle changes that would add considerably more weight and increase the complexity of the basic engine.

This is a substitute application for U.S. application Serial Number 816,984 filed May 29, 1959, by the applicant herein and now abandoned.

The invention, briefly described, is a noise suppressor comprising in conjunction with the jet engine nozzle structure, radially placed movable blades around the circumference of the nozzle having their contour arranged so that upon proper adjustment the spaces between such radially disposed blades are capable, simultaneously and alternately at adjacent spaces, of either expanding the flow of exhaust gas or maintaining it in a choke condition as it passes by the blades, such movable radial blades being located in the exhaust stream commencing ahead of the nozzle and continuing rearwardly out beyond the nozzle so that vortices are formed in the exhaust gas flow at or near the termination of the blades, at which location there is no surrounding cowling or nozzle structure.

Figure 1:
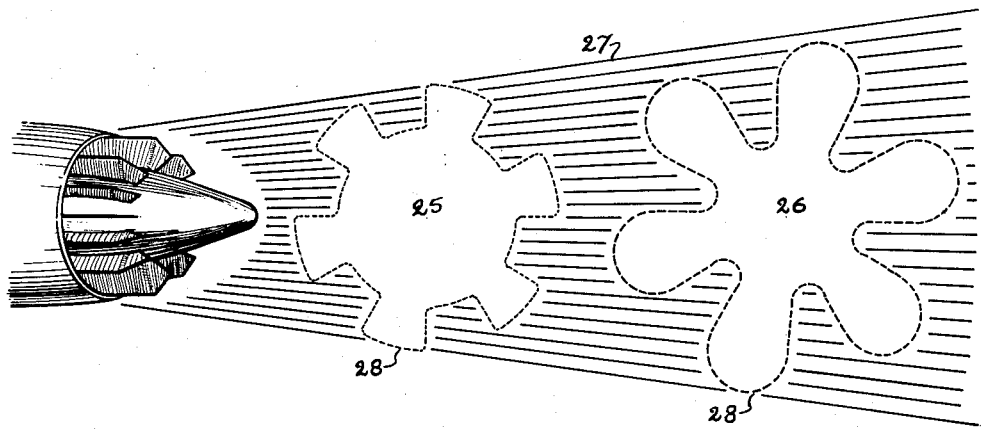

This invention and its purpose will be better understood by reference to the following drawings, in which:

FIG. 1 is a perspective view of the nozzle end of a jet engine showing in light lies a representative expanding tail cone of the exhaust gases, and at two locations in dotted lines showing the approximate contour of the representative exhaust stream during noise suppression operations.

Figure 2:
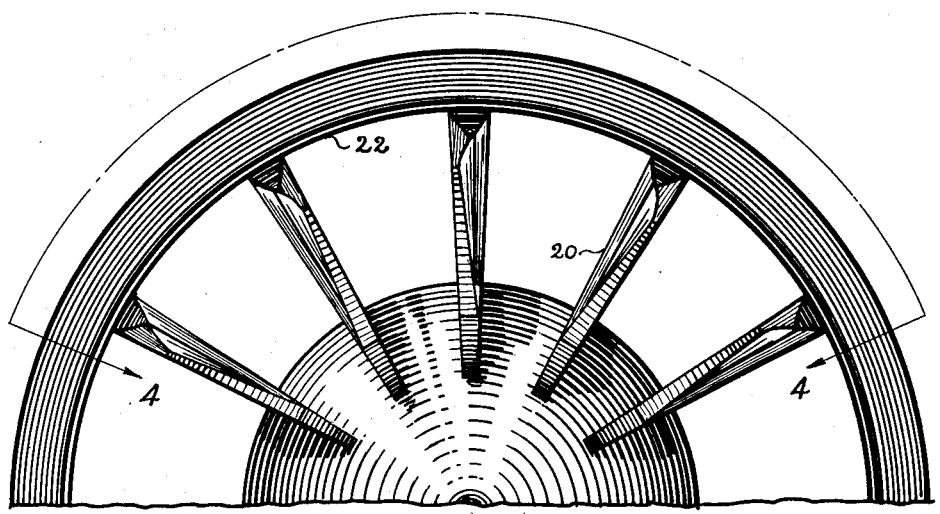
Figure 3:
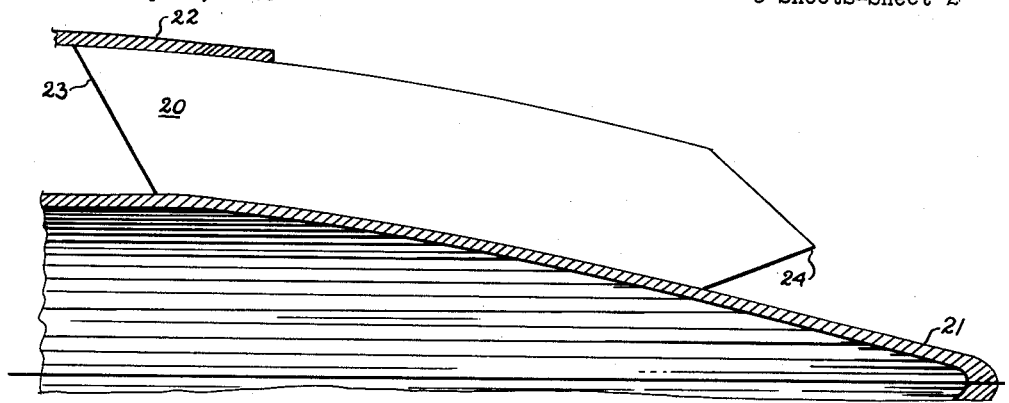
Figure 4:
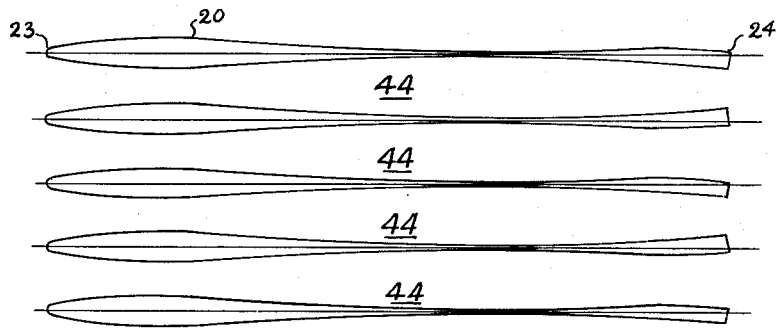
Figure 5:
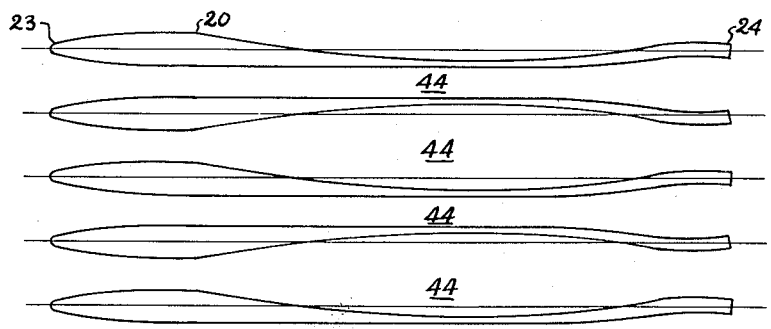
Figure 6:
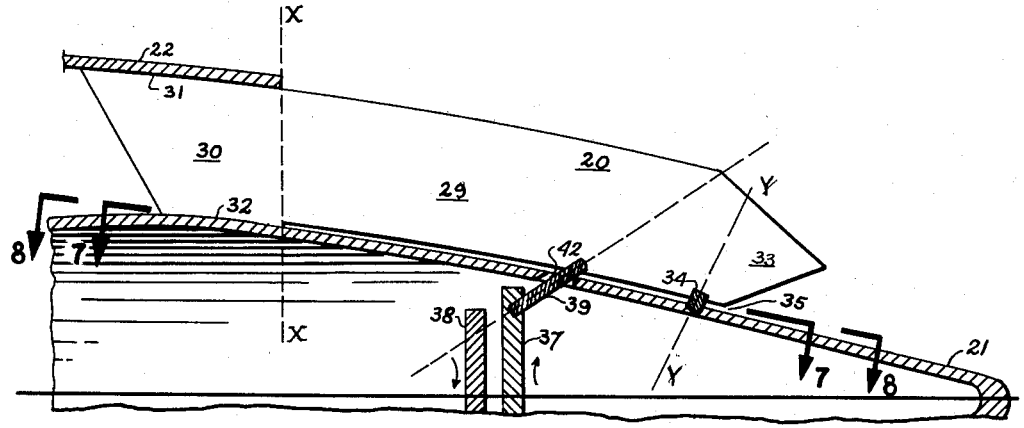
Figure 7:
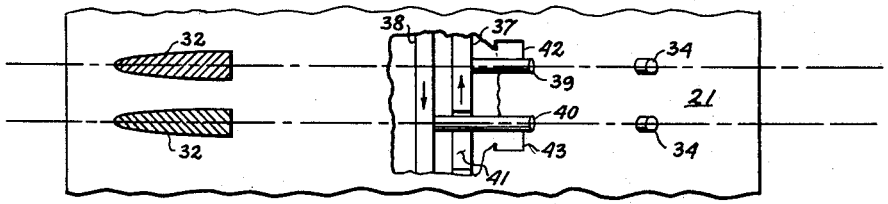
Figure 8:
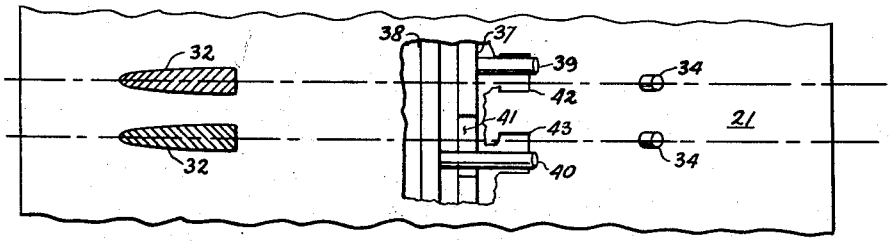
Figure 9:
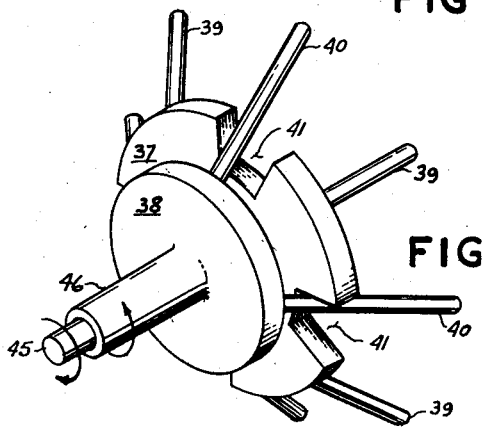

FIG. 2 is a rear view of the nozzle showing the spacing of the blades around the circumference, FIG. 3 is a longitudinal sectional view through the engine tail cone and nozzle showing the elevation of a blade, FIG. 4 is a view taken at 4—4 of FIG. 2 with the annular housing removed and with the blades rotated to non-suppression position, FIG. 5 is a view similar to FIG. 4 but with the blades rotated to maximum noise suppression position, FIG. 6 is a longitudinal section view, similar to FIG. 3, showing an elevation of a blade taken through the tail cone and flexible mounting structure of the blade, FIG. 7 is a partial sectional plan view taken at 7—7 of FIG. 6 showing the blade mounts and deflecting mechanism in non-noise suppression positions, FIG. 8 is a partial sectional plan view taken at 8—8 of FIG. 6 showing the blade mounts and deflecting mechnism in noise suppression position, and FIG. 9 is an isometric view of part of the blade positioning mechanism partially shown in FIGS. 7 and 8.

Many attempts have been made to reduce the sound associated with the entire operation of turbojet engine airplanes, but especially when they are landing, taking off, and taxiing around airports, and flying over residential areas adjacent to such airports. Sound reduction to levels of piston engine airplane operation has been obtained by mixing ambient air quickly and in quantity with the issuing jet stream along its boundaries. Prior successful attempts have employed direct physical means to cause the mixing, thus reducing the noise. Structural configurations were mounted on the engines to split up the engine exhaust gas stream, increasing mixing by causing the gases to change their direction as they passed through special ducts or were specifically redirected by deflecting blades. However, both the ducts and blades obstructed the flow considerably reducing the propulsive thrust, and required many additional structural parts establishing an undesirable weight penalty.

This invention, particularly as illustrated in FIG. 1 is directed at the same overall purpose of reducing noise by creating an opportunity for the ambient air to mix with the exhaust gas stream quickly and in quantity along its boundaries. However, the formation of the exhaust gas stream to increase the available mixing arenas is not done by substantially redirecting the exhaust gas stream through a system of spaced ducts, deflectors or other structure, but rather by changing the velocities and pressures to be found in the exhaust gas stream so that the energy of the gas stream itself creates its own irregularities in contour increasing the available area or periphery of the ambient air mixing arenas. These pressure and velocity differentials are created by the astute placement of radial blades 20 extending in a longitudinal direction and spaced circumferentially around the periphery of the exhaust nozzle tail cone 21 or engine rearward extending structure. Exhaust nozzle tail cone 21 is a central longitudinal axial blade support that matches the forward engine structure. This tail cone 21 is mounted internally and concentrically of an annular housing 22 and protrudes rearwardly therefrom a substantial distance. Each blade 20 extends from an upstream position at its leading edge 23 ahead of the termination of the annular housing 22 to a downstream position substantially beyond the housing to the blade trailing edge 24. The blades 20 are formed aerodynamically as shown in FIGS. 2, 3 and 4, and are adjustable in a plane substantially radial to the tail cone 21 from their faired cruise positions shown in FIG. 4 to their contoured silencing positions of FIG. 5. These blades 20 or airfoils are blade-like in shape, each having a substantially constant thickness. At all times the blades 20 offer a minimum resistance to flow. When in the silencing positions the blades 20 establish side by side exhaust gas passages that are dissimilar, as each blade is oppositely deflected by an actuating means. When in this silencing position, each of the blades 20 form the common side wall between two adjacent unlike passages to form the alternated wide and narrow passages 44, 44, 44, 44, FIG. 5. Within the dissimilar passages, exhaust gas flows under different velocity and pressure conditions. When these exhaust gas passages terminate completely, as the blades terminate, the mixing process is well started, being fostered by the effects of the vortices that occur near and at the blade trailing edges beyond the nozzle housing 22. The vortices result from the oppositely directed radial pressure components, the components being in an outward direction at the termination of one exhaust gas channel and in an inward direction at the termination of the adjacent exhaust gas channel. The overall flow of the exhaust gas stream, as altered by this controlled mixing, results in substantially the external exhaust gas flow contour shown in the typical cross sections 25 and 26 of FIG. 1. The irregularity of the contour within the overall conically-shaped expansion zone 27 of exhaust gases sets the stage for more rapid mixing with the ambient air that surrounds all the multiple surface boundaries of the exhaust gas stream 28. The mixing with the ambient air along these multiple surfaces of the exhaust gas stream occurs more quickly and in larger quantities than normally would have occurred had the exhaust gas been discharged directly from a conventional nozzle. As a result of the better mixing there is an adsorption of much of the energy that otherwise would have supported undesirable noise generation, thereby reducing the overall noise emission to an acceptable value.

Once the vicinity of the airport is departed from and the airplane is on its way at higher altitudes to its destination, the need for noise suppression may be entirely eliminated or at least reduced to a very small portion of that requirement needed previously in the airport area, a small reduction possibly being necessary either for avoiding structural damage and/or to lessen cabin noise. This reduction of the noise suppression capabilities of the suppressor is accomplished by again adjusting the blades, near their minimum cross section in a circumferential direction, to align them with the gas stream flow as shown in FIG. 4. The exhaust gases then pass between all the blades in substantially a like manner reducing the pressure and velocity differentials, thereby eliminating the vortices and turbulence, and regaining the conventional discharge pattern of the exhaust gases to once again acquire the maximum propulsive efficiency.

The mounting and adjustment of the blades 20 could be accomplished by using several combinations of structural mounts and mechanisms. One such combination is illustrated in FIGS. 6, 7, 8 and 9.

In this embodiment the movement of the blades 20 from their non-noise suppression position illustrated in FIG. 4 to their noise suppression position depicted in FIG. 5 is accomplished by applying a force in a radial plane to the central portion 29 FIG. 6 of the blade 20 in a circumferential direction about the tail cone peripheral surface. This results in obtaining the proper aerodynamic contour of the blades 20, their leading portions 30 being permanently secured at each blade top edge 31 to annular housing 22, each blade bottom edge 32 being secured to the portion of the exhaust nozzle tail cone 21 internally of the annular housing, and the blade trailing portion 33 being pivotally secured to the exhaust nozzle tail cone 21 through the pivot pin 34. Sufficient clearance is provided at 35 between the blade 20 and the tail cone 21 throughout the central portion 29 and the trailing portion 33 of the blade 20. Or stated differently, clearance 35 is provided from the forward pivotal axis X—X, through the rearward pivotal axis Y—Y to the trailing portion 33 of the blade 20.

The forces that are applied in the radial plane to the central portion 29 of the blade 20 are derived in this embodiment by opposite rotation of adjacent discs or annular rings 37 and 38, FIGS. 6–9. Other conventional means for rotating the discs are not shown beyond the concentric power shafts 45 and 46 shown in FIG. 9. The disc movement is transmitted to the respective blades 20 by pin or rod like connectors 39 and 40 comprising flexible mounting means. One end of all the rods terminates in a blade 20, the other end terminates alternately in ring 37 or ring 38. The shorter rods 39 terminate in ring 37 and the longer rods 40 terminate in ring 38.

FIGS. 7 and 8 illustrate the movement of the mechanism from the non-noise suppression position of FIGS. 4 or 7 where the parallel passageways 44 between the blades are of equal width, to the suppression position of FIGS. 5 or 8 where alternate passages 44 are wide and narrow, respectively. The rings 37 and 38 rotate in opposite direction carrying the connectors 39 and 40 farther apart resulting in the blade position changes illustrated in FIGS. 4 and 5.

In FIG. 9, more clearly than in FIGS. 7 and 8, cutaways 41 are shown in ring 37. They provide clearance for the opposite movement of the connecting rods 40 which extend on through to the ring 38. There are additional cutaways 42 and 43 in the exhaust nozzle tail cone 21 to provide clearance for both connecting rods 39 and 40, respectively.

This combination of structural mounts and mechanisms serves to illustrate one of several possible combinations that could be utilized to move the flexible blades 20 from the noise suppression to non-noise suppression positions.

I claim as my invention:

1. A noise suppressor for modulating the noise generated about the exhaust gas stream of an engine comprising,
   (a) an engine nozzle including a tail cone having a forward portion and an aft portion, and an annular housing circumscribing and concentric to said tail cone forward portion,
   (b) a plurality of parallel blades mounted on said tail cone, one end of each blade being connected to said nozzle internally of said housing, each blade extending aft and externally of said housing in a longitudinal radial plane of said tail cone, the other end of each blade being connected to the tail cone aft portion to form parallel passageways between each pair of adjacent blades,
   (c) said blades being flexible in a circumferential direction about the tail cone peripheral surface whereby the width of said passageways may be varied,
   (d) means for flexing said blades, and
   (e) said blade flexing means deflecting adjacent blades in opposite directions thereby forming alternate wide and narrow passageways for maximum noise suppression.

2. A silencer for modulating the noise generated about the exhaust gas of an engine comprising the combination,
   (a) an engine nozzle comprising,
      (1) a tail cone having a forward portion and an aft portion, and
      (2) an annular housing circumscribing and concentric to said tail cone forward portion,
   (b) a plurality of parallel blades mounted on said tail cone, the forward end of each blade being connected to both said annular housing and said tail cone, the aft end of each blade being connected to the housing in a longitudinal radial plane of said tail cone, the aft end of each blade being connected to the tail cone aft externally of said housing to form parallel passageways between each pair of adjacent blades,
   (c) said blades being flexible in a circumferential direction about the tail cone peripheral surface for varying the width of said passageways,
   (d) said tail cone having means for flexing said blades, and
   (e) said blade flexing means deflecting adjacent blades in opposite directions thereby forming alternate wide and narrow passageways for maximum noise modulation.

3. A noise suppressor for controlling energy of the exhaust gas stream at the rear of jet propulsion power plants, comprising housing and tail cone structure of a thrust nozzle and a plurality of circumferentially spaced apart blade-like airfoils radially mounted in the exhaust gases between the nozzle housing and the engine tail cone, the adjacent blades being oppositely contoured and commencing within the nozzle and extending beyond the nozzle housing terminus defining circumferentially arranged, alternately wide and narrow complete exhaust gas passages, each of said blades forming the common side wall between two adjacent unlike passages in which differential pressures and velocities occur during power plant operation between the adjacent unlike passages thereby creating overall flow irregularities such as vortices to increase the mixing of ambient air with the exhaust gases following their discharge from the exhaust nozzle.

4. In combination, an aircraft jet engine having a nozzle housing and projecting central tail cone at the downstream end thereof defining an annular conduit through which said engine discharges exhaust gas to atmosphere, and vortex generators for variably suppressing noise generated about the exhaust gas jet stream as it mixes with ambient air, comprising a plurality of circumferentially spaced apart airfoils radially mounted at their upstream portions, as structural members between the nozzle housing and the central tail cone, and flexibly mounted thereafter, to the projecting central tail cone beyond the nozzle housing, adjacent airfoils being oppositely contoured and forming passageways therebetween, and an actuating means to move selectively said adjacent airfoils in opposite direction between alternate positions of either substantial alignment with or reasonable flow modulation of the entire gas jet stream flowing in said passageways.

5. A silencer for selectively modulating the noise generated about the exhaust gas stream of an engine as the stream mixes with ambient air, comprising a housing circumferentially matching the housing of engine exhausts, a central longitudinal axial support matching engine structure, a plurality of circumferentially spaced apart airfoil blades structurally positioned radially between the housing and said axial support and extending beyond the housing, each blade having a substantially constant thickness, flexible mounting means on the axial support supporting the extending blade portions, adjacent airfoil blades being oppositely contoured in a plane substantially radial to said axial support and forming alternately wide and narrow passageways therebetween, and actuating means on the axial support to move selectively said adjacent airfoil blades in opposite directions between alternate configurations either substantially aligned with the entire exhaust gas jet stream to substantially equalize velocities and pressures of the exhaust stream or substantially contoured into the exhaust gas jet stream forming alternately wide and narrow passageways to create a circumferential pattern of differential pressures and velocities of the exhaust stream.

6. A noise suppressor for modulating the noise generated about the circular exhaust gas stream of an engine comprising:
(a) an engine rearwardly extending structure adjacent and parallel to the engine exhaust stream,
(b) a plurality of rearwardly extending blades on said engine rearwardly extending structure, said blades protruding into the engine exhaust stream forming exhaust gas passageways with said engine rearwardly extending structure,
(c) said blades having a constant thickness, and
(d) said blades being deformed in a circumferential direction about said circular exhaust gast stream, the deformation of each adjacent blade being in opposite directions forming alternate wide and narrow exhaust gas passageways for maximum noise suppression.

7. The noise suppressor of claim 6 in which:
(a) said engine rearwardly extending structure has means for deforming said blades between a position wherein said blades are parallel to each other for least aerodynamic resistance and a position wherein said adjacent blades are deformed in opposite directions for maximum noise suppression.

8. The noise suppressor of claim 6 in which:
(a) each of said blades forms the common side wall between two adjacent exhaust gas passageways.

References Cited by the Examiner
UNITED STATES PATENTS

| | | |
|---|---|---|
| 2,337,861 | 12/43 | Adamtchik. |
| 2,558,816 | 7/51 | Bruynes _____ 138—37 |
| 2,648,192 | 8/53 | Lee _____ 60—35.6 |
| 2,934,889 | 5/60 | Poulos _____ 60—35.6 |
| 2,940,252 | 6/60 | Reinhart _____ 60—35.6 X |
| 3,036,429 | 5/62 | Schairer _____ 60—35.6 |
| 3,161,257 | 12/64 | Young _____ 60—35.6 X |

FOREIGN PATENTS
165,369   9/55   Australia.

SAMUEL LEVINE, *Primary Examiner.*